United States Patent [19]
Klawuhn et al.

[11] Patent Number: 5,778,765
[45] Date of Patent: Jul. 14, 1998

[54] BEVERAGE BREWING APPARATUS

[75] Inventors: Manfred Klawuhn, Frankfurt am Main; Christof Miltenberger, Oberreifenberg; Roland Müller, Dreieich; Andreas Peter, Kronberg; Gerhard Schäfer, Frankfurt am Main, all of Germany

[73] Assignee: Braun Aktiengesellschaft, Germany

[21] Appl. No.: 763,416

[22] Filed: Dec. 11, 1996

[30] Foreign Application Priority Data

Dec. 30, 1995 [DE] Germany .................. 195 49 227.7

[51] Int. Cl.$^6$ .................................................. A47J 31/34
[52] U.S. Cl. ........................................... 99/290; 99/300
[58] Field of Search .......................... 99/290, 295, 300, 99/302 R

[56] References Cited

U.S. PATENT DOCUMENTS

| 4,204,465 | 5/1980 | Knecht | 99/300 X |
| 4,632,024 | 12/1986 | Cortese | 99/300 X |
| 4,947,738 | 8/1990 | Eugster | 99/300 X |

FOREIGN PATENT DOCUMENTS

| A-0 004 659 | 3/1979 | European Pat. Off. |
| 0 342 516 A1 | 5/1989 | European Pat. Off. |
| A-0 427 666 A1 | 10/1990 | European Pat. Off. |
| A-0 523 278 A1 | 7/1991 | European Pat. Off. |
| A-0 631 752 A1 | 6/1993 | European Pat. Off. |
| A-818 729 | 10/1937 | France |
| 36 07 173 A1 | 10/1987 | Germany |
| 87 17 864.8 | 1/1991 | Germany |
| 39 41 476 A1 | 6/1991 | Germany |
| 41 30 447 A1 | 3/1993 | Germany |
| 42 04 746 A1 | 10/1993 | Germany |

*Primary Examiner*—Reginald L. Alexander
*Attorney, Agent, or Firm*—Fish & Richardson P.C.

[57] ABSTRACT

The invention is directed to a beverage brewing apparatus having a water reservoir (1) and a pump (6) powered by an electric motor (45), the pump pressurizing water from the water reservoir (1) and delivering it to a flow-through heater (11) heated by an electric heater (14). In the flow-through heater (11), water is heated in a water conduit (13) and subsequently fed to a pressure chamber (35), adapted to be filled with coffee grinds, of a brewing unit (34) from which, following an extraction operation, the brewed coffee flows into a receptacle (38, 39). According to the invention, a valve device (20) opening when a predetermined pressure is exceeded is provided in the fluid path (9, 13, 15) between the flow-through heater (11) and the brewing unit (34). As a result, the water current delivered by the pump (6) and flowing through the flow-through heater (11) is maintained nearly constant, causing a uniform transfer of heat in the flow-through heater (11) and avoiding a standstill condition of the electric motor (45). This also keeps the temperature control of both the flow-through heater (11) and the water heated in the flow-through heater (11) at an approximately constant level.

12 Claims, 2 Drawing Sheets

BEVERAGE BREWING APPARATUS

This invention relates to a beverage brewing apparatus.

BACKGROUND OF THE INVENTION

A beverage brewing apparatus of this type is known, for example, from EP-0 342 516 A1. In this beverage brewing apparatus, the flow-through heater is comprised of a unit heater in which water-carrying conduits heated by a heating device are formed. Unit heaters of this type are relatively sluggish as regards their temperature control, since it always takes a certain amount of time for the casting preferably made of aluminum first to heat up and then, after transferring its heat to the water, to cool down again. This can also have a disadvantageous effect on the water temperature because the temperature always fluctuates over a range of several degrees Celsius on account of the sluggishness of the unit heater's temperature control. Unit heaters of this type are also elaborate to manufacture and require a rather large amount of casting material of high thermal conductivity such as, for example, aluminum, in order to store heat.

In addition to the water conduit in this unit heater, there is also a steam conduit into which only a small quantity of water per unit of time is fed in order to produce steam, which is used, for example, to heat beverages or to froth milk. Hence to produce steam, a valve is actuated which, for one purpose, blocks the movement of the water in the direction towards the conduit arrangement responsible for making an espresso and simultaneously releases a throttled water supply to the steam conduit, and which, for other purpose, activates a second heating device so that the temperature of the unit heater rises, thus making it at all possible for steam to be produced in sufficient quantity.

From DE-36 07 173 A1 there is further known an electric beverage brewing apparatus in which the flow-through heater is comprised of a heating rod brazed to a water conduit. Flow-through heaters of this type are able to store practically only very little heat because the water conduit and the heating rod are relatively thin, providing accordingly little material for the storage of heat. This flow-through heater produces hot water, conveying it practically unpressurized into a coffee filter arranged above the flow-through heater. Conveyance of the hot water is effected in that steam bubbles are formed in the water conduit, rise in the riser, and thus compel the hot water to follow them in their rising movement. Hence this flow-through heater serves as a hot water feed pump in addition to heating the water.

From DE-41 30 447 A1 there is also known an espresso maker with a water heater that is comprised of a reservoir adapted to be filled with water, and a heating device arranged at the base of the reservoir. Provided between the heating device and the base of the reservoir is a steam pipe suitable for the generation of steam. The heating device and the steam pipe are arranged one above the other and are connected both with one another and with the base of the reservoir in a manner conducting heat well. With this water heater, the entire water held in the reservoir must first be heated, which takes a relatively long time, before the espresso maker is ready for operation. Aside from its advantageous storage of a large quantity of hot water, a water heater of this type is not only elaborate but also expensive to manufacture.

With this espresso maker, the hot water is pumped by an electrically powered pump to a pressure chamber of a brewing unit where under pressurized conditions it then washes extractives out of the coffee grinds, which flow out of the brewing unit as coffee or particularly espresso beverage while crema is being formed. As the hot water under pressure enters the pressure chamber, obstructions may occur at the mesh filter, as on all espresso makers, if the outlet holes are very small and have become clogged up with very finely ground coffee powder that is now wet. Consequently, the pressure in the pressure chamber continues to rise until the performance limit of the pump's electric motor is reached and the pump steadily slows down until it finally comes to a halt. As soon as the pressure in the pressure chamber is reduced again slightly by beverage flowing through the clogged filter holes, the electric motor moves again slowly and some water is again pumped into the pressure chamber. This cycle will ultimately continue until a sufficient quantity of espresso beverage has been made and the apparatus is switched off. In this process, the electric driving mechanism and hence the pump as well are subjected to far too high a load, not to mention the relatively long duration of the brewing operation. This may even result in the electric motor or the pump suffering damage.

To counteract these high loads on the pump and the electric motor it is possible to enlarge the filter holes so that even the finest coffee powder does not clog the filter holes. This has the disadvantage, however, of not producing sufficiently good crema. A further possibility is to provide in the pressurized system a valve device (breather hole) which is released in the presence of a rising pressure in the pressure chamber and an attendant expansion between the piston and the housing, whereby excess pressure in the pressure chamber can be released to the atmosphere. Such a displacement of the piston relative to the pressure chamber is described in prior German patent application No. 44 36 080.0 and is implemented in the "Braun Espresso Cappuccino Pro" espresso maker distributed by the applicant himself (see 1995/96 Braun Program Catalog, issue October 1995).

Further, there is known a beverage brewing apparatus equally distributed by the applicant himself and offered for sale under the designation "Braun Espresso Master professional", E 400 T model (see Braun Program Catalog, January 1992 issue) With this espresso maker, a pump powered by an electric motor is provided in the outlet pipe of the water reservoir, the electric motor being formed by an armature oscillating in accordance with the frequency of the electricity supply. A flow-controlled pressure-relief or vent valve is provided on the outlet pipe downstream of the pump, said valve releasing water and any air that may be present in the fluid path through a return pipe to the water reservoir in the event of an inadmissibly high pressure above atmospheric (25 bar, approximately).

The outlet pipe is connected with the pressure chamber of a brewing unit which is adapted to be filled with coffee grinds and discharges an extracted espresso beverage. The unit heater which in this apparatus absorbs a high level of stored heat energy acts as a flow-through heater and is based on the effect of thermal damping by inert (large) bodies of aluminum and/or water, thus leveling off the irregular consumption of heat during a pumping operation, meaning that a relatively uniform water temperature can be accomplished only if the heat storage body and/or the body of water is large (as a result of long water lines) and if the heating power in the unit heater is high. Unit heaters of this type are therefore elaborate and expensive.

SUMMARY OF THE INVENTION

It is an object of the present invention to improve a beverage brewing apparatus for making an espresso or cappuccino beverage according to the prior-art portion of patent claim 1 such that the flow-through heater becomes extremely simple and economical in construction.

According to the present invention, a beverage brewing apparatus is created which can produce steam for cappuccino in addition to making an espresso beverage. For this purpose, provision is made according to the present invention for a three-way valve suitable for the generation of steam utilized in the frothing up of milk or the warming up of a beverage (third position or steam and cappuccino position), in addition to making an espresso beverage. By providing between the flow-through heater and the brewing unit a pressure control valve which opens when a predetermined pressure above atmospheric is exceeded, it is possible to use a flow-through heater which is extremely low in mass and hence simple and economical in construction while still having a relatively high heating power, because a constant volumetric flow of water is pumped through the flow-through heater, irrespective of whether a large or small amount of the espresso beverage flows out from the mesh filter of the pressure chamber.

Thus, as soon as a specified operating pressure (selectable between 10 and 18 bar) is exceeded in the piping between the pump and the pressure chamber, the pressure-relief valve opens, and as much hot water is discharged through the pressure-relief valve as is required to maintain the water temperature at a constant, optimum level in and downstream of the flow-through heater, that is, the water current delivered by the pump remains constant in the flow-through heater although it is not directed completely through the mesh filter of the pressure chamber.

Accordingly, the pressure-relief valve does not wait to open until inadmissibly high pressures occur in the piping, which can cause the piping to burst or develop a leak, on the contrary, it opens much earlier, namely in the pump's middle to upper operating range. This also prevents overloading of the electric motor and the pump. To maintain a constant speed at the electric motor as the pressure rises, either the electric motor can be dimensioned sufficiently large to cope with this power level without any appreciable reduction of speed, or an electric control arrangement can be integrated to control the electric motor, said control arrangement taking load- or speed-dependent measurements, correcting the speed subsequently. The same applies also to the generation of steam because it uses the same flow-through heater and the same pressure control valve. This saves components and reduces the cost of the universal apparatus for making coffee and steam.

The uniform throughflow and heating of water in the water conduit of the flow-through heater results in uniform heat transfer at a constant level of heating power, and there is no spontaneous rise of temperature of the flow-through heater and the temperature of the brewing water at rising pressure and hence a decreasing volumetric rate of flow in the flow-through heater. An important aspect is that the volumetric flow delivered by the pump has a practically constant delivery rate in the entire operating range up to opening pressure.

A further advantage of the configuration of the present invention is that an extremely short heat-up period of less than 30 seconds is required for the espresso maker to become ready for operation. This is accomplished by the extremely low-mass flow-through heater, which heats up extremely quickly on account of its small body.

According to another aspect of the invention it is actually assured that the temperature of the water fluctuates only very slightly and that a distinct overstepping of the maximum temperature is prevented. To maintain a constant volumetric flow, regardless of the water pressure, any displacement-type pump may be used (piston pumps, rotary piston pumps), provided their driving mechanism (electric motor) permits maintenance of a constant speed. While in oscillating armature pumps the frequency of the piston is constant, but the piston stroke is not always constant under rising pressure, their use in connection with the present invention is not recommended. In this case, namely, it would be necessary to make an unreasonably high control effort at the oscillating armature pump and at the heating device to keep the temperature of the water constant. Alternatively, the oscillating armature pump would have to be dimensioned sufficiently large to prevent any notable reduction of the volumetric capacity before the pressure-relief valve opens, which is, however a task difficult to implement.

According to another aspect of the invention are provided to obtain a particularly low-mass flow-through heater. Flow-through heaters of this type utilized in coffee makers and operating without pressure, such as that described very generally in German patent application No. 40 23 920.9, have been in use for a long time. However, when a flow-through heater of this type is used in an espresso maker, it is necessary for the temperature control arrangement, which controls the temperature of the heating device and hence the temperature of the water to be heated, to be adapted to the new conditions of installation. With uniform throughflow and heating of the water in the flow-through heater, the temperature control arrangement may well switch off and on more frequently at a high heating power (1200 to 1500 watts, approximately), but this does not have a disadvantageous effect on the water temperature because the flow-through heater responds quickly to changes of temperature, particularly on account of the low-mass heater.

According to another aspect of the invention the surplus hot water is fed to a return pipe leading to a container. In this arrangement, the valve device may be inserted either in the return pipe itself or at a branch-off point in the fluid path between the water heater and the brewing unit.

According to another aspect of the invention the return pipe leads to the water reservoir, thus forming a closed water circuit in which also the hot water flowing off through the return pipe is returned to the brewing cycle. While the cold water component is heated by the hot water returned to the water reservoir, such heating of the cold water is not of great consequence, considering that the brewing time for making an espresso lasts only a few seconds. If, however, the water held in the reservoir should be heated so much as to result in an inadmissible formation of steam bubbles in the flow-through heater on account of boiling water, then the temperature control device will switch off the heating device of the flow-through heater for a short time.

According to another aspect of the invention a particularly simple valve device is obtained which is comprised of a valve seat provided in the branch-off point or in the return pipe, and a sealing body urged into engagement with the valve seat by the force of a spring. Valves of this type are extremely low-cost items opening reliably at the predetermined opening pressure in dependence upon the predetermined spring force and size of the sealing face. As a result of the pressure control effected by the valve device, pressure peaks in the fluid path are also prevented advantageously so that the pipes, hoses and threaded couplings provided in the interior of the beverage brewing apparatus are not exposed to inadmissibly high pump pressures. By this means, the electric motor and the pump are subjected to reduced loads.

This results likewise in a reduction of the cost of a beverage brewing apparatus because the need for high-stress components is obviated.

According to another aspect of the invention a multi-way valve is arranged downstream of the branch-off point of the safety valve in the fluid path heading toward the brewing unit, said valve releasing to atmosphere any residual pressure remaining in the fluid pipe between the flow-through heater and the multi-way valve when the espresso operating mode is switched to zero position. When the beverage brewing apparatus is switched on, this expansion pipe to atmosphere is closed, enabling pressure to build up in the fluid path heading toward the brewing unit. The advantage of pressure release at zero position is that the pressure chamber, which as a rule is formed by a filter basket holder and a brewing head, can easily be detached and that it is not necessary beforehand to release the pressure still existing in the pressure chamber, which can lead to soiling from outflowing powder coffee beverage when the filter basket holder is removed from the brewing unit.

According to another aspect of the invention the two-way valve is connected to an electric switching arrangement, which in its first position (espresso position) supplies the electric motor with electricity and hence drives the pump, and which in its second position (zero position) disconnects the electric motor from the supply, switching over the heating device to the preheating mode. At the same time, the fluid path is opened to atmosphere via the expansion pipe. Because of the preheating after the apparatus is switched on, the flow-through heater is at operating temperature after a minimum of time, enabling hot water or steam to be produced immediately after switching on the pump without any cold water flowing initially to the brewing unit. After the pump is switched off, it blocks the path from the water reservoir, and the apparatus switches over again to the preheating cycle. In addition to the flow-through heater being maintained at operating temperature, it is also first cleared of any residual water by evaporation and ejection of the residual water through the return pipe. The formation of steam bubbles also clears the return pipe of residual water. One-hand operation becomes possible by means of this arrangement. An ON/OFF switch may be connected upstream of the switching arrangement in order to disconnect the apparatus entirely from the line and connect it thereto.

According to another aspect of the invention an electric switching arrangement is provided which greatly reduces the speed of the electric motor and hence the pumping capacity in the steam mode to the extent that the water component entering the flow-through heater evaporates completely and is then fed via the third position (steam or cappuccino position) of the multi-way valve to a steam tapping point.

According to one aspect of the invention the features of patent claim 10, the beverage brewing apparatus utilizes a four-way valve which can be used to make not only espresso but also normal coffee or tea (fourth position or coffee and tea position), as well as steam. This feature too then makes provision for an electric switching arrangement with which the same pump speed is generated for making either an espresso or coffee, and by means of which the pump speed is reduced when producing steam. The zero position of the multi-way valve is the position in which the electric motor is switched off and at the same time fluid flow in the direction towards the coffee or tea filter and to the brewing unit is inhibited, while at the same time the pipe leading to the steam discharge device is connected to atmosphere in order, on the one hand, to prevent any backflow of coffee beverage from the filter and the brewing unit to atmosphere and, on the other hand, to depressurize the fluid path between the pump and the multi-way valve and finally to evacuate it (preheating cycle).

According to another aspect of the invention a beverage brewing combination apparatus is provided enabling the preparation of espresso, coffee, or steam for warming up or frothing milk.

According to another aspect of the invention the axles of the switching arrangement and of the multi-way valve are coupled to each other so that actuation of the multi-way valve involves at the same time a corresponding adjustment of the switching arrangement. The axles of both the switching arrangement and the multi-way valve can be combined to form a common axle, thus reducing the number of components employed. This results in an advantageous one-hand operation of the multi-way valve and the switching arrangement of the beverage brewing apparatus.

BRIEF DESCRIPTION OF THE DRAWINGS

An embodiment of the beverage brewing apparatus according to the present invention is illustrated in the accompanying drawings. In the drawings.

DESCRIPTION OF THE PREFERRED EMBODIMENTS

Figure 1:
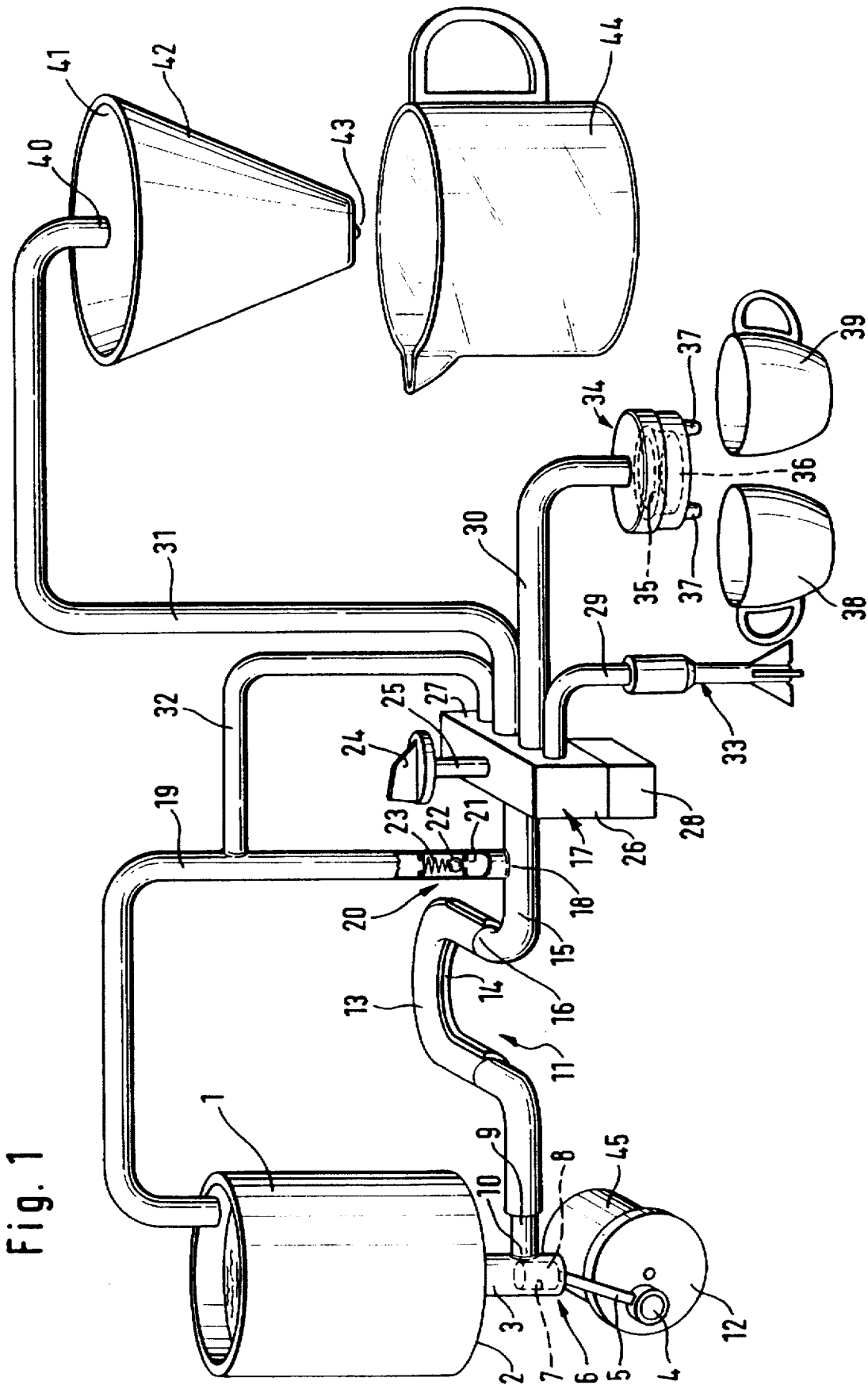
FIG. 1 is a schematic representation of a beverage brewing apparatus structure suitable for making espresso, coffee and steam.
Figure 2:
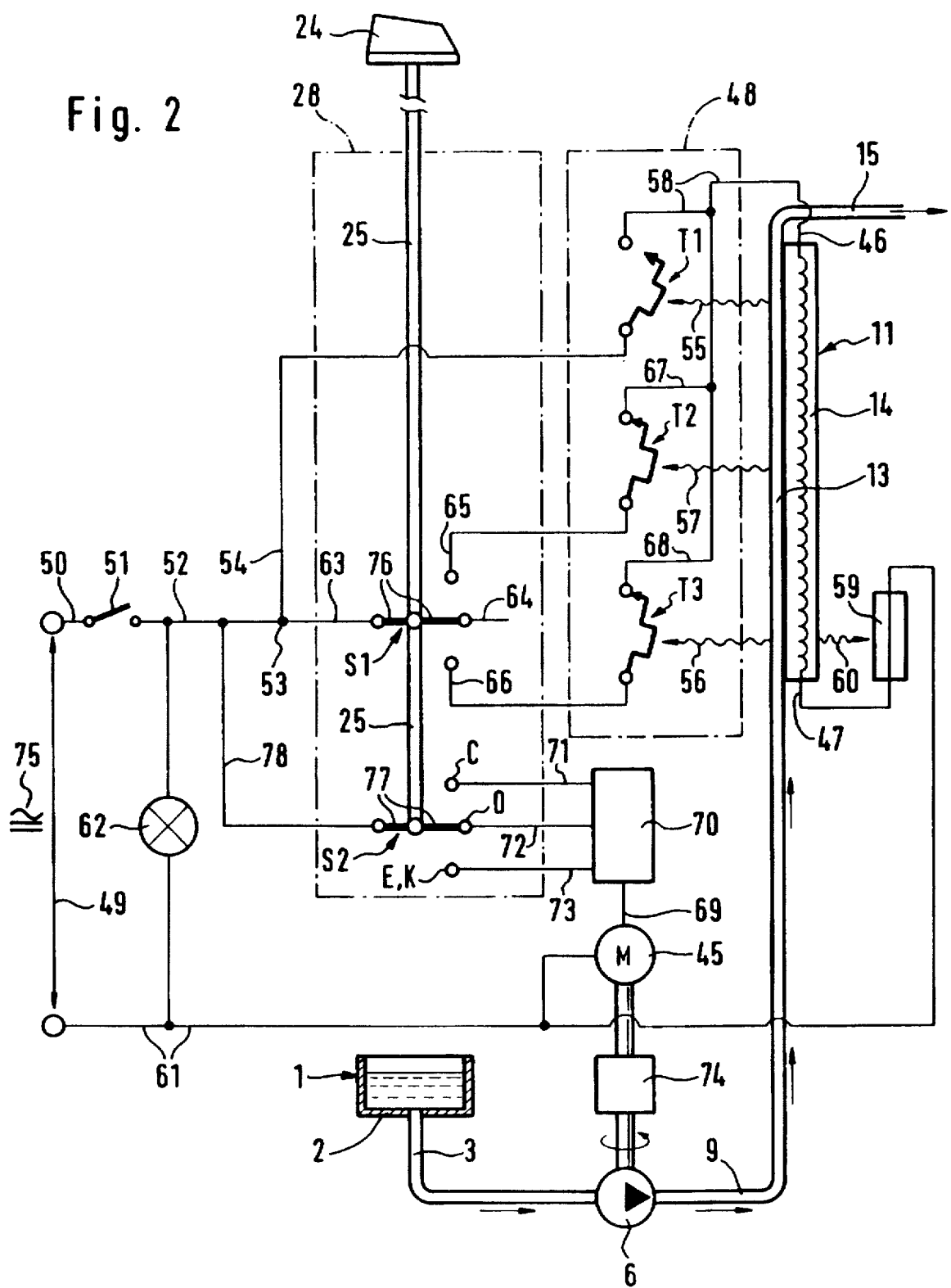
FIG. 2 is a schematic circuit diagram of the beverage brewing apparatus of FIG. 1.

Referring now to FIG. 1 of the drawings, there is shown the schematic structure of a beverage brewing apparatus without electric devices, which is suitable for integration in a housing not shown in the drawing. The beverage brewing apparatus of FIGS. 1 and 2 is comprised essentially of a water reservoir 1 having an outlet pipe 3 at its base 2. The outlet pipe 3 accommodates a piston pump 6 which according to FIG. 1 is comprised of a connecting rod 5 driven by an eccentric device 4 and having at its free end a piston 8 which is adapted to reciprocate inside a bore 7. Arranged on the inlet side of the piston pump 6 is a valve, not shown in greater detail in the drawing, which opens when water is drawn in from the water reservoir 1, and inhibits flow in the direction of the reservoir 1 when water is ejected from the piston pump 6. A pressure valve, not shown in detail in the drawing either, is provided at the outlet 10 of the piston pump 6 and acts in exactly the reverse way, that is, it closes the outlet 10 during the suction stroke of the piston pump 6, and it opens the outlet 10 to the flow-through heater 11 during the compression stroke.

In the plane behind the eccentric disk 12 on which the eccentric device 4 is provided, there is a transmission arrangement not shown in detail in FIGS. 1 and 2, which is connected with a pinion, equally not shown in the drawing, of an electric motor 45. Instead of the piston pump 6 shown in FIG. 1, which is driven by an eccentric device 4, it is also possible to use an oscillating armature pump with constant stroke control or any other fluid pump with practically constant throughflow (also at a higher pressure of 15 bar, maximum).

Connected to the outlet 10 of the piston pump 6 of FIGS. 1 and 2 is a pipe 9 opening into the U-shaped water conduit 13 of the flow-through heater 11. Underneath the water conduit 13 and brazed or welded thereto for good thermal conductivity is a tubular heating element 14, which is also U-shaped like the water conduit 13. The tubular heating element 14 includes electric terminals 46, 47 (not shown in FIG. 1), which are connected to an electric switching arrangement 28 and a temperature control arrangement 48, as described in detail with reference to FIG. 2.

Connected to the discharge port 16 of the water conduit 13 is an outlet pipe 15, which according to FIG. 1 leads to a multi-way valve 17. Between the multi-way valve 17 and the flow-through heater 11 in FIG. 1 is a branch-off point 18 from which a return pipe 19 leads back to the water reservoir 1. The return pipe 19 accommodates a pressure-relief valve 20 which is essentially comprised of a sealing seat 21 and a ball 22 urged into sealing engagement therewith by the force of a spring 23. For the sake of simplicity, this pressure-relief valve 20 is shown only schematically with the sealing seat 21, the ball 22 and the spring 23. It will be understood, of course, that other types of pressure-relief valve may also be contemplated. In FIG. 2, the outlet pipe 15 ends short of the branch-off point 18. That part of the beverage brewing apparatus of FIG. 1 adjoining the branch-off point 18 is also a component of FIG. 2 but this section is not shown in FIG. 2 for the sake of simplicity.

According to FIGS. 1 and 2, the multi-way valve 17 has a manually operable rotary button 24 which is connected via the axle 25 to valve closure elements, not shown in the drawing, which are rotatably carried in bores (not shown) in the housing 26 of the multi-way valve 17. The multi-way valve 17 is coupled via the axle 25 to an electric switching arrangement 28 in such a way that rotation of the rotary button 24 involves, apart from an adjustment of the multi-way valve 17, also an adjustment of the electric switching arrangement 28, by means of which the speed of the electric motor and the heating device 14 of the flow-through heater 11 are controlled.

On the one side, the multi-way valve 17 is connected to the outlet pipe 15, while a steam pipe 29, an espresso pipe 30, a coffee or tea pipe 31 and an expansion pipe 32 branch off on the other side 27. The steam pipe 29 leads to a steam nozzle 33 in which, on the one hand, the steam speed is raised and, on the other hand, means are provided for actually enabling the formation of froth when dipped into milk. The free end of the espresso pipe 30 leads to a brewing unit 34 which is comprised of a pressure chamber 35 adapted to be filled with coffee grinds and having at its outlet a mesh filter 36 through which the finished espresso beverage is delivered to spouts 37 from where it flows into cups 38, 39 placed underneath. The end 40 of the coffee pipe 31 is arranged vertically above the opening 41 of a coffee filter holder 42 in which a paper filter is insertable for receiving the amount of coffee grinds required for the coffee brewing operation. The bottom of the filter holder 42 has an outlet hole 43 through which the brewed coffee or tea beverage flows out into a receptacle 44 placed underneath.

FIG. 2 shows the electric switching arrangement 28 connected with the rotary button 24 and the axle 25 (in the dot-and-dash frame) and the temperature control arrangement 48 connected with the flow-through heater 11 (in the dot-and-long-dash-short-dash frame) in the form of an electric circuit diagram supplied with power from an electric voltage source 49. A line 50 leads from the electric voltage source 49 to an electric switch 51 having its output connected via the line 52 to a junction point 53. From the junction point 53, a line 54 leads to a temperature control device T1 which is switched on and off in dependence upon the temperature of the flow-through heater 11. The temperature control device T1 opens when the flow-through heater 11 has a temperature t1 of 160° C., approximately. The temperature t1 is the preheating temperature of the flow-through heater 11, which develops at the flow-through heater 11 after switching on the electric switch 51, that is, before the piston pump 6 is actuated by the motor 45. The wavy line 55 symbolizes the radiant heat acting on the temperature control device T1 from the flow-through heater 11. The same applies to the wavy lines 56 and 57 which represent the heat acting on the temperature control devices T3 and T2 from the flow-through heater 11.

According to FIG. 2, the output of the temperature control device T1 is connected via line 58 to the electric terminal 46 of the tubular heating element 14 of the flow-through heater 11. Connected to the electric terminal 47, which lies downstream of the tubular heating element 14, is a thermal fuse 59 which stands in direct thermal contact (represented by the wavy line 60) with the tubular heating element 14. This thermal fuse 59 responds if the tubular heating element 14 reaches an inadmissibly high temperature, that is, if the heating element threatens to melt because any one of the temperature control devices T1, T2 or T3 fails to open. The thermal fuse 59 is connected via the output line 61 to the other terminal of the electric voltage source 49. The electric voltage source 49 can be connected to a source of a.c. or d.c. voltage, which is represented by the symbol 75.

Connected between the lines 52 and 61 according to FIG. 2 is a lamp 62 which lights up when the switch 51 is closed, thus indicating to the operator that the beverage brewing apparatus is in the ON-condition. A further line 63 branches off from the junction point 53 parallel to the line 54 and leads to a three-way way switch S1. The axis 25 mechanically connects the three-way switch S1 with the rotary button 24 in a non-rotating relationship to each other. With its contact member 76, the three-way switch S1 is movable into any one of three positions in which contact can be established between the three-way switch and respective output lines 64, 65, and 66. While the first output line 64, when in contact with the contact member 76, represents the zero position of the three-way switch S1, contact established between the contact member 76 and the second output line 65 causes the temperature control device T2 to be connected to the voltage source 49 and in turn to the tubular heating element 14 via the line 67 and the line 58. The temperature control device T2 is used for the steam or cappuccino mode, switching to its open position at a temperature of 200° C., approximately. When the contact member 76 makes contact with the third output line 66, the connection between the temperature control switch T1 and the first output line 64 is interrupted, going instead to the third output line 66 which is connected to a third temperature control device T3 which is connected to the tubular heating element 14 via the line 68 and line 58. The third temperature control device T3 is used for controlling the water temperature when making an espresso. In this mode, the temperature control device T3 is required to cycle such that the hot water flowing out of the water conduit 13 reaches a temperature of 95° C. At the same time, this third temperature control device T3 controls the water temperature when making a coffee beverage, which likewise lies at around 95° C. The temperature control devices T1, T2 and T3 are fastened to the flow-through heater 11 or are arranged in its vicinity in such a way that the temperatures desired for the individual operating modes develop, which include the standby mode (preheating temperature of 160° C., approximately), the cappuccino mode (temperature of 200° C., approximately), and the espresso mode (water temperature of 95° C., approximately).

According to FIG. 2, the axle 25 of the electric switching arrangement 28 is further connected mechanically with a second three-way switch S2 serving the function of controlling the speed of the electric motor 45. For this purpose, an electric control arrangement 70 is connected to the electric motor 45 via the line 69, which control arrangement has three inputs 71, 72, 73 from the switch S2, said inputs being adapted to be connected to the contact member 77 of the electric switch S2 in dependence upon the rotary position of the axle 25. The contact member 77 is connected to the voltage source 49 via the line 78. The input 72 of the switch S2 represents the zero position, the input 71 represents the steam and cappuccino position, and the input 73 represents the espresso and coffee position. In cappuccino position "C", in which steam is to be produced in the water conduit 13, the electric control arrangement 70 controls the electric motor 45 with a lower speed than in the espresso or coffee position "E", "K", in which the electric motor 45 drives the piston pump 6 with a far higher speed in order to thus heat hot water to a temperature of 95° C., approximately.

The mode of operation of the beverage brewing apparatus of FIGS. 1 and 2 of the present invention is as follows:

Zero Position:

When the electric switch 51 is switched on, the lamp 62 lights up and current flows via the line 54 to the still cold and hence closed temperature control device T1 and from there via the line 58 to the tubular heating element 14. The return line then leads via the thermal fuse 59 and the output line 61 to the other terminal of the voltage source 49. In zero position the switch S2 is connected at the same time to the input 72 so that the electric motor 45 is not supplied with electricity and is therefore at a standstill. In zero position, the tubular heating element 14 is heated until it has a preheating temperature of 160° C., approximately. At this temperature, the temperature control device T1 opens, interrupting the electricity to the tubular heating element 14. As soon as the temperature drops below a specified value, the temperature control device T1 closes again and the tubular heating element 14 and hence the flow-through heater 11 are heated again to the turn-off temperature of 160° C. This preheating cycle is completed in a minimum of time because the flow-through heater 11 is of very low mass. This preheating cycle continues as long as the electric switch 51 remains on and as long also as the electric switching arrangement is not turned out of zero position.

Cappuccino Position:

If cappuccino is now to be made, the electric switching arrangement 28 is adjusted by means of the rotary button 24 and the axle 25 in such a way that the three-way switch S1 makes contact via the contact member 76 with the second output line 65, while at the same time the contact member 77 of the switch S2 makes contact with the input 71. As this occurs, the switches S1 and S2 leave their respective zero positions. The switches S1 and S2 then occupy the cappuccino position, and electricity is fed into the tubular heating element 14 because the temperature control device T2 is closed because it is still below its turn-off temperature of 200° C.

At the same time, the electric control arrangement 70 is controlled via the input 71 in such a way that the electric motor 45 rotates at reduced speed, thereby driving the piston pump 6 via a transmission arrangement 74 inserted between the electric motor 45 and the pump 6 so that only just enough water flows through the pipe 9 into the water conduit 13 as can evaporate therein and be fed to the multi-way valve 17. Considering that on adjustment of the electric switching arrangement 28 to the cappuccino mode, the multi-way valve 17, which is equally connected with the axle 25, was also moved into the cappuccino position, the steam is directed through the steam pipe 29 to the steam nozzle 33 where it escapes at an accelerated speed. Upon immersion of the nozzle, this steam mixes with milk, which thus forms a froth. At the end of the frothing operation, the multi-way valve 17, the electric switching arrangement 28 and the temperature control arrangement 48 are returned to zero position, in which process the multi-way valve 17 releases the path to an expansion pipe 32 leading via the return pipe 19 to the water reservoir 1. The steam pressure built up in the piping 9, 13, 15 is released to the water reservoir 1 via the pipes 32, 19. As this occurs, fluid flow in the pipes 29, 30 and 31 is blocked in the direction towards the expansion pipe 32 by the multi-way valve 17 to prevent milk or coffee residues from being fed back to the reservoir 1.

Espresso or Coffee Position:

When making an espresso, the rotary button 24 is turned away from the zero position until the contact member 76 of the three-way switch S1 breaks the connection to the first output line 64 (zero position), making instead contact with the third output line 66. At the same time, the contact member 77 of the switch S2 travels from input 72 to input 73. This is then the espresso position in which the temperature control device T3 is closed because its opening temperature lies above the preheating temperature of the temperature control device T1.

At the same time, a pulse goes from the electric control arrangement 70 to the electric motor 45, causing the motor to rotate at a higher speed than in the cappuccino mode. The piston pump 6 draws water from the water reservoir 1, feeding it through the pipe 9 into the preheated water conduit 13 in which the water is heated and routed through the pipe 15 to the multi-way valve 17, where it flows through the espresso pipe 30 into the brewing unit 34. There the hot water extracts the brew from the espresso powder held in the pressure chamber 35. The finished espresso beverage flows, accompanied by the formation of crema, through the mesh filter 36 and the spouts 37 into the cups 38, 39 placed underneath. Because the flow-through heater is preheated, hot water enters the pressure chamber 35 right from the start of this cycle.

During the brewing operation it is possible that, depending on the fineness of the grind and the degree of tamping, the volume of water delivered evenly by the piston pump 6 may not flow out of the spouts 37 at an equivalent rate but is slowed down on its passage through the espresso powder to such an extent that pressure above atmospheric develops in the pipes 9, 13, 15 and 30. To maintain pump operation at a practically unchanged speed of the electric motor 45 while at the same time maintaining the delivery rate through the flow-through heater 11 constant, the pressure-relief valve 20 opens under rising pressure, enabling excess water to flow back through the return pipe 19 to the water reservoir 1 while the amount of water per unit of time that can pass through the coffee grinds in the pressure chamber 35 flows out through the spouts 37. This pressure control arrangement has the effect, on the one hand, of not allowing excessive pressures to develop in the piping 9, 13, 15, 30 and, on the other hand, of allowing a constant volumetric flow of water to flow through the flow-through heater 11 and be heated there uniformly. In this process, the temperature control device T3 controls the temperature of the tubular heating element 14 and hence the water temperature in the water conduit 13. If the water inside the water reservoir 1 is heated by the returning hot water to the extent that the flow-through heater 11 is fed with more and more hot water, the temperature control device T3 finally switches off, thereby preventing overheating of the water in the water conduit 13.

A further advantage of the pressure-relief valve 20 is that the electric motor 45 and hence the piston pump 6 are not subjected to unreasonably high loads by excessively high pressure, which ultimately would have disadvantageous effects on the electric motor 45 due to excessively high thermal loading, and on the piston pump 6 due to premature leakage at the piston sealing ring or other wear symptoms. While the speed of the electric motor 45 may drop under rising pressure until the pressure-relief valve 20 responds, this can be compensated for, if necessary, by a control arrangement that keeps the speed of the electric motor 45 constant under rising pressure and which can be integrated in the control arrangement 70. The same effect can be accomplished with a somewhat more powerful electric motor 45.

As a result of the constant delivery rate of water through the water conduit 13—regardless of whether more or less water flows through the brewing unit 34—the heat transfer in the flow-through heater 11 is uniform and there is no spontaneous increase in the brewing water temperature.

When the espresso making is completed, the rotary button 24 is returned to zero position, and the contact member 77 of the switch S2 interrupts the connection to the input 73, making instead contact with the input 72. At the same time, the contact member 76 of the switch S1 travels from the third output line 66 to the output line 64.

Making Coffee:

When making a coffee, the electric switching arrangement 28 is moved to the same position as previously explained for making espresso. However, the rotary button 24 and hence the axle 25 are turned further until the pipes 29, 30 are blocked and the pipe 31 to the filter 42 is opened. The same procedure follows as for making espresso except that now the hot water, rather than being routed through the espresso pipe 30, is fed through the coffee pipe 31 to the filter 42 where, after extracting the brew from the coffee grinds inside the filter 42, it flows as coffee beverage out of the outlet hole 43 into a receptacle 44 placed underneath. In this mode, it is as a rule unnecessary for the valve device 20 to open because the cross-sections of the coffee pipe 31 are dimensioned sufficiently large to prevent any notable pressure above atmospheric from occurring in the piping 9, 13, 15.

Upon completion of the coffee mode, the electric switching arrangement 28 is returned to its zero position, causing the pipes 29, 30, 31 to be closed and the expansion pipe 32 to the return pipe 19 to be opened by turning of the multi-way valve 17 in order for any residual water remaining in the water conduit 13 to be fed back to the water reservoir 1. This is accomplished in that in zero position the temperature control device T1 is closed, causing the tubular heating element 14 to be preheated until the entire water in the water conduit 13 evaporates and is fed back to the water reservoir 1 through the expansion pipe. Only then does the temperature in the tubular heating element 14 rise, and with it also the temperature in the temperature control device T1, until the latter reaches its turn-off temperature of 160° C., approximately, and opens.

Upon completion of one or several different brewing operations, the beverage brewing apparatus can be deactivated completely by opening the electric switch 51, whereby the lamp 62 is also extinguished. To indicate to an operator that the flow-through heater 11 has been put into standby mode (preheating cycle), a further lamp (not shown) may be included in this circuit, which lamp is controlled by the temperature control device T1.

At this point it should be noted that it is well within the spirit and scope of the present invention to envisage an electric motor 45 which in the coffee mode operates at a speed different from that in the espresso mode. However, this would involve greater complexity, and the switch S1 would need to be equipped with a further output line and the switch S2 with a further input in order to produce a different speed at the electric motor 45 for the coffee mode than for the espresso mode. An embodiment of this type would make sense only if a far greater volumetric flow of water per unit of time were needed in the coffee mode than in the espresso mode.

Still further, it is also possible to make provisions for an additional position in the multi-way valve 17 and in the switching arrangement 28 to accommodate an additional cup warming function. Such an arrangement requires the provision of a further contact device in switches S1 and S2 of the electric switching arrangement 28 to control the temperature of the water on the one hand, and the speed of the electric motor 45 on the other. In this position, the multi-way valve closes the pipes 29, 30 and 31 and opens the expansion pipe 32, through which water heated in the flow-through heater 11 then flows into a separate basin (not shown), which is closed with a steam-permeable tray top (not shown), on which cups can be placed for warming. An arrangement of this type is illustrated in FIG. 3 of prior German patent application No. 195 45 111.2 of Dec. 04, 1995 and is described in detail in the description thereof.

What is claimed is:

1. A beverage brewing apparatus comprising:
    a water reservoir;
    a pump for pressurizing water from the reservoir;
    an electric motor for powering the pump;
    a flow-through heater including a U-shaped pipe and an electric heating element for heating water delivered from the pump;
    a first pipe branch connected to an output side of the flow-through water heater and leading to atmosphere;
    a second pipe branch connected to the output side of the flow-through water heater;
    a brewing unit including a pressure chamber adapted to be filled with coffee grinds and to be fed with heated water from the heater, and from which, following an extraction operation, brewed coffee flows into a receptacle;
    a valve device located in said first pipe branch, which opens when a predetermined pressure is exceeded;
    a steam discharge device;
    an expansion pine branch leading to atmosphere;
    a steam pipe branch leading to the steam discharge device;
    an espresso pipe branch leading to the brewing unit;
    a multi-way valve having an input side connected to said second pipe branch and having an output side connected to said steam pipe branch, said espresso pipe branch, and said expansion pipe branch, said multi-way valve, when in a first valve position, establishing a connection to the brewing unit, while blocking connections to atmosphere and to the steam discharge device, said valve, when in a zero position, blocking flows into the brewing unit and the steam discharge device, while connecting the second pipe branch to atmosphere through the expansion pipe, and said valve, when in the third valve position, blocking flows into the espresso and expansion pipe, while establishing a fluid flow to the steam discharge device.

2. The beverage brewing apparatus as claimed in claim 1, wherein said pump delivers a nearly constant volumetric flow over the operating pressure range until the said valve device opens.

3. The beverage brewing apparatus as claimed in claim 1, wherein said flow-through heater comprises a water conduit and an electric tubular heating element in good thermal contact with said water conduit.

4. The beverage brewing apparatus as claimed in claim 1, wherein said valve device is connected to said first pipe branch leading to a container.

5. The beverage brewing apparatus as claimed in claim 4, wherein said container is the water reservoir.

6. The beverage brewing apparatus as claimed in claim 1, wherein said valve device is a pressure-relief valve closing in dependence upon a spring force and opens when the water pressure in the said water heater pipe and outlet pipe branch exceeds a predetermined pressure above atmospheric.

7. The beverage brewing apparatus as claimed in claim 1, wherein said multi-way valve has two valve positions; the first valve position (espresso position), establishing the connection to the brewing unit while blocking the connection to atmosphere, and, the zero position, blocking the pipe leading to the brewing unit while opening the connection to the expansion pipe leading to atmosphere.

8. The beverage brewing apparatus as claimed in claim 7, wherein said multi-way valve is coupled to an electric switching arrangement in such a manner that in the first valve position (espresso position) the said electric motor rotates at a predetermined speed, that the adjustment of the multi-way valve from the first position into the zero position brings rotation of the electric motor to a halt, setting the said flow-through heater to the preheating cycle.

9. The beverage brewing apparatus as claimed in claim 1, wherein said multi-way valve is coupled to an electric switching arrangement in such a manner that in the first valve position (espresso position) the said electric motor rotates at a predetermined speed, that the adjustment of the multi-way valve from the first position into the zero position brings rotation of the electric motor to a halt, setting the flow-through heater to the preheating cycle, and that-in the third position of the multi-way valve the speed of the electric motor is reduced such that as a result of the low amount of water delivered to the flow-through heater also steam can be produced which serves the function of warming up beverages or frothing milk.

10. The beverage brewing apparatus as claimed in claim 1, further comprising a coffee/tea pipe branch, and a coffee/tea brewing unit and wherein said multi-way valve has four valve positions establishing the connection to the brewing unit in the first valve position (espresso position) while blocking flow in the direction towards atmosphere, towards the steam discharge device, and towards the coffee or tea filter, said valve, when in the zero position, blocking the flow to the pipe leading to the brewing unit, to the pipe leading to the coffee or tea filter, and to the pipe leading to the steam discharge device while establishing fluid flow from the said outlet pipe to the expansion pipe leading to atmosphere, said valve, when in the third position (steam or cappuccino position), blocking fluid flow to the pipes leading, respectively, to the brewing unit to atmosphere and to the coffee or tea filter while establishing fluid flow to the steam discharge device, and said valve, when in the fourth position (coffee position), inhibiting flow to the pipes leading, respectively, to the brewing unit, to atmosphere and to the steam discharge device while releasing fluid flow in the pipe leading to the coffee or tea filter.

11. The beverage brewing apparatus as claimed in claim 10, wherein said multi-way valve is coupled to an electric switching arrangement in such a manner that in the first position (espresso position) the electric motor rotates at a predetermined speed, that the adjustment of the multi-way valve from the first position (espresso position) into the zero position brings rotation of the electric motor to a halt, setting the flow through heater to the preheating cycle, that in the third position (steam or cappuccino position) of the multi-way valve the speed of the electric motor is reduced such that as a result of the low amount of water delivered to the flow-through heater also steam can be produced which serves the function of warming up beverages or frothing milk, and that in the fourth position (coffee position) of the multi-way valve the speed of the electric motor is equal to the motor speed in the first position (espresso position).

12. The beverage brewing apparatus as claimed in claim 9 wherein the said electric switching arrangement is integrated in the multi-way valve, that both the switching arrangement and the multi-way valve comprise (include each) an axle, and that said axles are coupled to each other.

* * * * *